ELECTROACOUSTIC FLOWMETER

Filed July 29, 1955

INVENTOR.
Jack Kritz
BY
Moser, Nolte, Crews + Berry
ATTORNEYS

United States Patent Office 2,912,856
Patented Nov. 17, 1959

2,912,856

ELECTROACOUSTIC FLOWMETER

Jack Kritz, Flushing, N.Y.

Application July 29, 1955, Serial No. 525,213

4 Claims. (Cl. 73—194)

The present invention relates to electroacoustic flowmeters.

This application is a continuation-in-part of my copending application Serial No. 474,403 filed December 10, 1954.

By propagating acoustic waves simultaneously in opposite directions in a fluid, it is possible to determine the flow of velocity of the fluid independently of the velocity of propagation of the acoustic waves. Similarly, it is possible to determine the velocity of propagation of the acoustic waves in the fluid independently of the flow velocity of the fluid.

The flowmeter exemplifying the present invention is of the type shown in my application No. 474,403 and includes a pair of piezo-electric transducers mounted on opposite sides of a pipe through which fluid flows. Each transducer includes, in effect, a transmitting piezoelectric crystal and a receiving piezoelectric crystal. The transmitting crystal of one transducer and the receiving crystal of the other transducer are interconnected by a feedback circuit including, for example, an amplifier and a wave packet generator. Each received wave packet is amplified and triggers the generator so as to cause wave packets to be re-propagated in a sustained manner. The acoustic waves are thus propagated through the fluid in opposite directions along substantially the same path. Any change in the flow velocity of the fluid will be accompanied by a corresponding change in the repetition frequency of the wave packets and the magnitudes of the respective changes will be in constant direct ratio to the flow velocity being measured.

While flowmeters of the type described in the preceding paragraph have very important advantages, I have discovered that they are subject to certain errors and that one source of these errors is the fact that acoustic waves transmitted by one transducer may be reflected by the other transducer back to the receiving crystal of the first transducer. The reflected waves may combine with waves transmitted by the transmitting crystal of the second transducer to produce a resultant voltage dependent on the phase relationship between the two waves. Because the reflected waves make two trips compared to the one trip by the direct waves, the phase difference between these two signals would be a sensitive function of the propagation velocity so that an appreciable error would be caused by a slight variation of the propagation velocity. Also the waves reflected back to the first transducer might be again reflected thereby to the second transducer where it might combine with the waves directly transmitted to the second transducer to produce errors which will be a sensitive function of the propagation velocity. Accordingly, it is a principal object of my invention to prevent such errors.

It is a general object of my invention to improve the operation of dual transducers.

It is another object of my invention to prevent errors in flowmeter measurements due to reflections of acoustic waves by the transducer housings or the inner faces of the piezoelectric crystals.

Other objects and advantages of my invention will become clear from the following descriptions and the drawing in which:

Fig. 1 is a block diagram of a flowmeter according to my invention;

Figure 2:
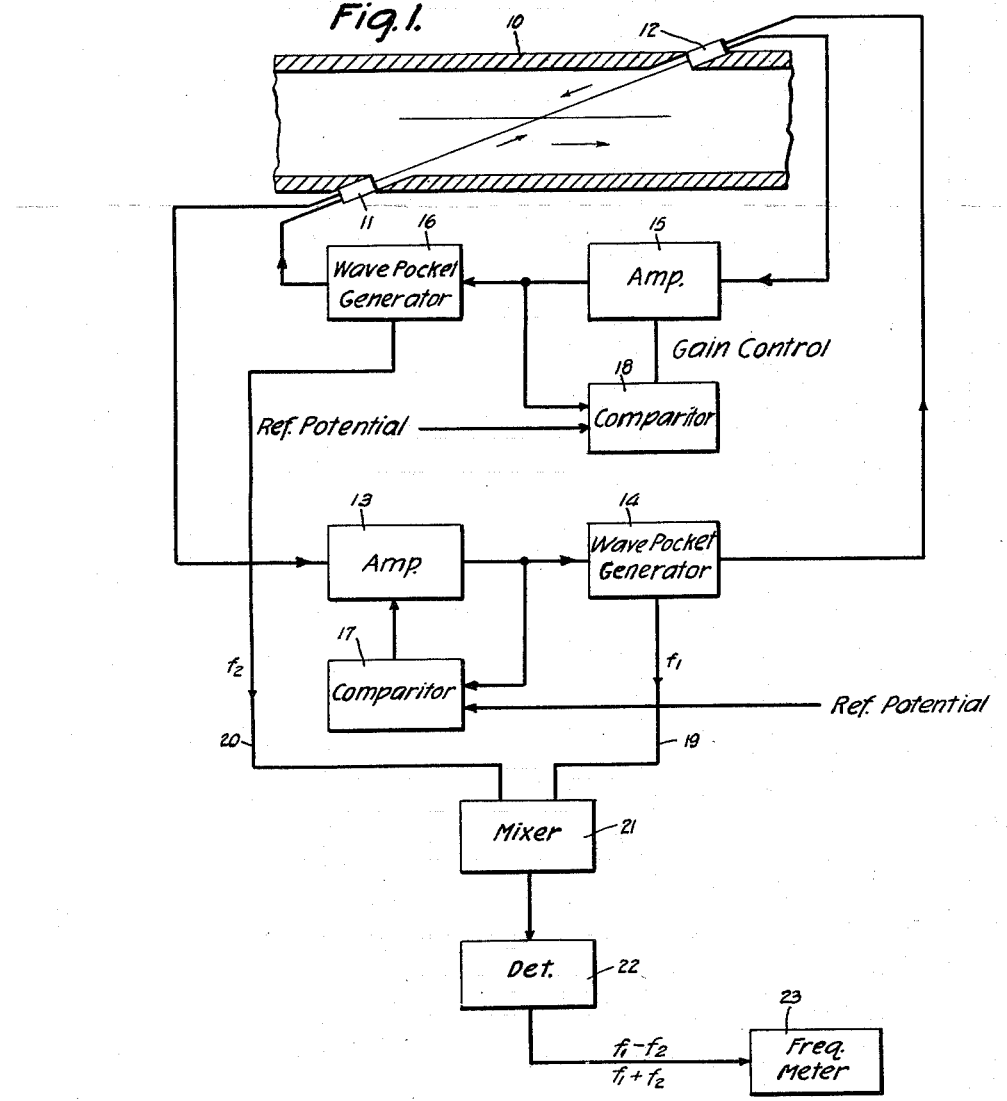
Fig. 2 is a longitudinal partial sectional view of a dual transducer.

In Fig. 1, an embodiment of the invention is illustrated using two dual transducers 11 and 12 mounted on opposite sides of a fluid conduit 10, through which a fluid may flow. Each transducer includes, in effect, a transmitting crystal and a receiving crystal, as shown in Fig. 2, for propagating acoustic waves through the fluid in opposite directions along substantially the same path. The receiving crystal of the transducer 11 is connected to the transmitting crystal of the transducer 12 by a feedback path consisting of an amplifier 13 and a wave packet generator 14. The receiving crystal of the transducer 12 is similarly connected to the transmitting crystal of the transducer 11 by another feedback path consisting of an amplifier 15 and a wave packet generator 16. The transducers 11 and 12 may be of the form illustrated in Figs. 2 and 3 which will be described in detail hereinafter. The feedback paths 13, 14 and 15, 16 are shown and described in detail in my copending application No. 474,403. When the waves which are received by the receiving crystal of transducer 11 and amplified by amplifier 13 reach a predetermined amplitude, generator 14 is triggered and responds by producing a limited train of waves or a wave packet. The wave packet thus produced is impressed on the transmitting crystal of transducer 12 and after being propagated thereby through the fluid, is received by the receiving crystal of the transducer 11 and again transmitted to the amplifier 13 and generator 14. Generator 14 is then triggered again and in this manner repeated wave packets are propagated through the fluid. In a similar manner, acoustic waves are propagated through the fluid in the opposite direction by means of the transmitting crystal of transducer 11, the receiving crystal of transducer 12 and the feedback path including the amplifier 15 and the wave packet generator 16.

In order to stabilize the amplitude of the output of amplifier 13, the output is fed to a comparator circuit to which there is also supplied a reference potential of a fixed value. The output of the comparator circuit 17 is impressed on the gain control element of the amplifier 13 so as to maintain the output thereof at a level determined by the reference potential and to remove fluctuation which may be caused by impurities in the fluid or by other factors. The comparator circuit 17 thus provides automatic gain control which maintains the output of amplifier 13 substantially constant. In the same manner, a comparator circuit 18 is provided with a reference potential and connected to the output of the amplifier 15 for controlling the gain of amplifier 15 so as to maintain its output substantially constant.

The wave packet generators 14 and 16 produce trains of wave packets having repetition frequencies $f_1$ and $f_2$ respectively. Pulses of these same frequencies are fed over connections 19 and 20 from generators 14 and 16 to the two inputs of a mixer circuit 21. The mixed signals are then fed to a detector 22. The mixer-detector combination may be a form of heterodyne converter or any other circuit capable of producing an output current having components or characteristics proportional to the sum of $f_1$ and $f_2$ or the difference between $f_1$ and $f_2$. Either of these components is selected and fed to a meter 23 which may be a meter of any type capable of giving an indication of the desired frequency component $f_2-f_1$ or $f_1+f_2$.

As has been fully explained in my previous applications, the arithmetic difference $f_2-f_1$ is directly proportional to the flow velocity of the fluid and is independent of the propagation velocity of the acoustic waves in the fluid. Similarly, the arithmetic sum $f_1+f_2$ is directly proportional to the propagation velocity of the waves in the fluid and is independent of the velocity of the flow of the fluid. Either of these characteristics of the fluid may thus be measured independently of the other.

Figure 3:
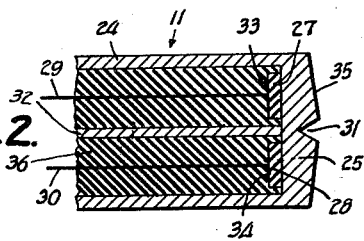
Fig. 3 is a diametrical sectional view of the transducer shown in Fig. 2.

Figs. 2 and 3 show details of the transducers 11 and 12. A metallic cylindrical housing 24 has an end wall 25 which may have an arbitrary thickness or may be dimensioned as described in my application, Serial No. 474,403. Within the housing 24 and on the wall 25, a pair of crystals 27 and 28 are mounted. One of these crystals serves as a transmitter and the other serves as a receiver. The crystals are provided with leads 29 and 30 connected to suitable electrodes on the crystals in a manner well known. Leads 29 and 30 extend to the input of one feedback path and the output of the other feedback path. The crystals may be semi-circular, as shown, although it will be understood that other crystal shapes can be used, several such different shapes being shown in my application Serial No. 474,403. In order to prevent or reduce acoustic coupling between the receiving and transmitting crystals, diametrical slot or notch 31 is provided in the end wall 25 so as to partially separate the two active halves of the end wall 25. A metallic wall 32 extends diametrically across the housing 24 between the two crystals 27 and 28 and serves to prevent or reduce electrical coupling between the crystals.

When a pair of transducers of the type shown in Figs. 2 and 3 are mounted on opposite sides of a pipe 10 as shown in Fig. 1, errors in the measurement may occur. I have found that a source of such errors arises from the reflection of acoustic waves from one transducer to the other transducer. These reflections occur from the walls 25 of the two transducers 11 and 12 which face each other, and additional reflections are produced from the inside walls 33 and 34 of the crystals themselves. Accordingly, the outer face 35 of the end wall 25 is tapered so that it is not perpendicular to the desired paths of the acoustic waves or the line joining the two transducers 11 and 12, and acoustic reflections occurring from the face 35 are then not transmitted back to the other transducer, but are instead, reflected in another direction and are eventually absorbed by the fluid. The slope or taper of face 35 may be very small and is exaggerated in the drawing for the purpose of illustration. The housing 24 is also filled with a suitable plastic such as an epoxy resin 36. Epoxy resin is a condensation product of poly functional phenols with epihalogenohydrin, an example of such a resin being "Araldite" 6020 or 6060 made by the Ciba Company. The resin may be poured into the housing 24 so that the crystals 27 and 28 become embedded in the resin 36. The resin filling not only provides increased protection and stability for the crystals but also reduces the reflection from the rear faces 33 and 34 of the crystals because the acoustic impedance of the resin 36 is closer to the acoustic impedance of the crystals 27 and 28 than is the acoustic impedance of air. A considerable portion, therefore, of the acoustic energy reaching the rear faces 33 and 34 of the crystals is transmitted into the resin 36 and absorbed thereby. Errors due to reflected waves are thus substantially avoided.

I have described what I believe to be the best embodiments of my invention. I do not wish, however, to be confined to the embodiments shown, but what I desire to cover by Letters Patent is set forth in the appended claims.

I claim:

1. An electroacoustic flowmeter comprising a pair of transducers mounted on opposite sides of a fluid container and facing toward each other for transmitting and receiving acoustic waves to and from each other, the transducers being arranged so that said waves travel through the fluid in substantially opposite upstream and downstream directions, each of said transducers comprising a housing having a wall in acoustic contact with the fluid and a piezoelectric transmitting means and a piezoelectric receiving means mounted on an inner face of said wall, a feedback path connecting the piezoelectric receiving means of each transducer to the piezoelectric transmitting means of the other transducer, each transducer including means for reducing the acoustic coupling between the transmitting means and the receiving means thereof, means on each transducer comprising an outer surface of said wall which is inclined with respect to the line of travel of acoustic waves between the pair of transducers for preventing the reflection of acoustic waves from each transducer to the other and means connected to said feedback paths for determining a velocity characteristic of the fluid.

2. A flowmeter according to claim 1, wherein said outer surface is tapered.

3. A flowmeter according to claim 1, wherein said housing is cylindrical, the outer face of said wall sloping in opposite directions from a diametrical line on said wall to the periphery thereof.

4. A flowmeter according to claim 1, wherein the housing of each transducer is cylindrical and the transducer receiving means and transmitting means comprise a pair of semi-circular crystals mounted therein, said wall having a groove extending diametrically there across in a plane intermediate said semi-circular crystals, said wall having two faces which slope from said groove toward the periphery so that the wall has a maximum thickness at the groove and a minimum thickness at the periphery.

References Cited in the file of this patent

UNITED STATES PATENTS

| | | |
|---|---|---|
| 2,505,867 | Meunier | May 2, 1950 |
| 2,527,986 | Carlin | Oct. 31, 1950 |
| 2,669,121 | Garman | Feb. 16, 1954 |
| 2,705,422 | Henry | Apr. 5, 1955 |
| 2,708,366 | Blocher | May 17, 1955 |
| 2,711,646 | Mendousse | June 28, 1955 |
| 2,724,269 | Kalmus | Nov. 22, 1955 |
| 2,748,369 | Smyth | May 29, 1956 |